C. L. JEANES.
MOTOR TRUCK BODY.
APPLICATION FILED OCT. 24, 1921.
1,434,705.
Patented Nov. 7, 1922.
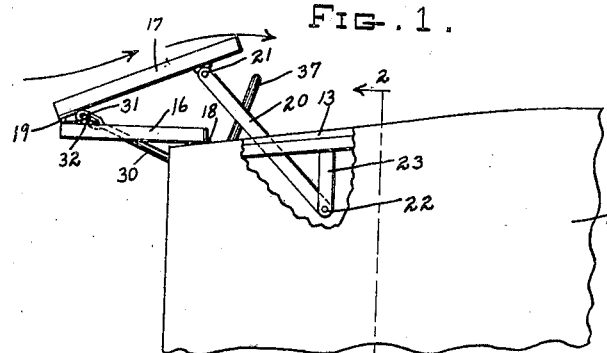
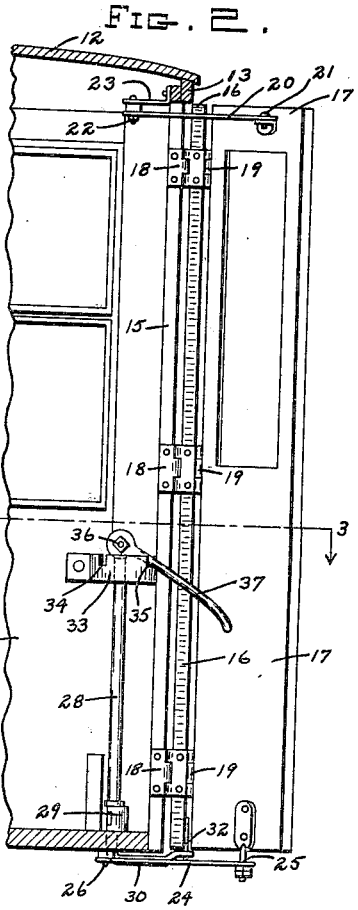
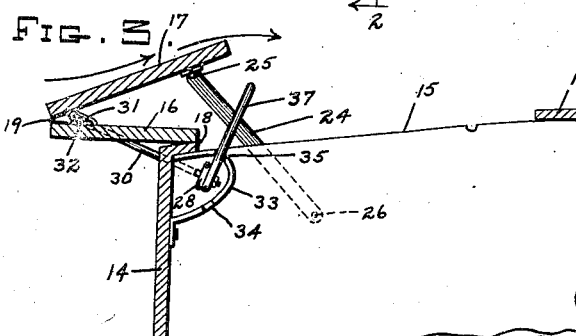
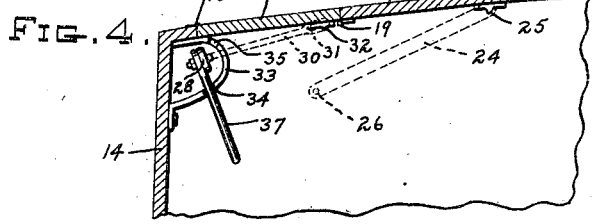
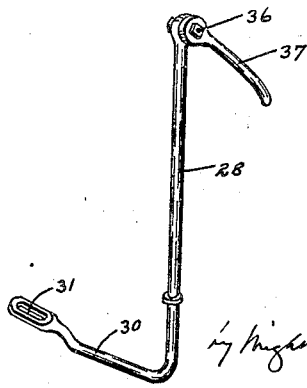
INVENTOR
C. L. Jeanes
by Hughes Brown Quimby May
ATTORNEYS Patented Nov. 7, 1922.

1,434,705

UNITED STATES PATENT OFFICE.

CHARLES L. JEANES, OF NORTH READING, MASSACHUSETTS.

MOTOR-TRUCK BODY.

Application filed October 24, 1921. Serial No. 509,965.

*To all whom it may concern:*

Be it known that I, CHARLES L. JEANES, a citizen of the United States, residing at North Reading, in the county of Middlesex and State of Massachusetts, have invented certain new and useful Improvements in Motor-Truck Bodies, of which the following is a specification.

This invention relates to the vestibule portion of a motor truck body, said portion being located forward of a storage space and containing the driver's seat, and the steering wheel and other accessories, the vestibule having a side doorway.

The invention is embodied in the door and door-operating and controlling means hereinafter described and claimed, the object of the invention being to provide a door which, when fully opened does not project objectionably or dangerously from the side of the vehicle, and is adapted to laterally deflect wind and prevent it from forcibly entering the vestibule through the doorway, and when fully closed securely closes the doorway.

Of the accompanying drawings forming a part of this specification,—

Figure 1 is a top plan view of a portion of the vestibule of a motor truck body embodying the invention, a portion of the roof being broken away, and the door being shown in its fully opened, wind-deflecting position.

Figure 2 is a section on line 2—2 of Figure 1, and an elevation of parts at the left of said line.

Figure 3 is a section on line 3—3 of Figure 2, and a plan view of parts below said line, the door being in the position shown by Figures 1 and 2.

Figure 4 is a view similar to Figure 3, showing the door closed.

Figure 5 is a perspective view of the rock-shaft and its handle and crank-arm hereinafter described.

The same reference characters indicate the same parts in all of the figures.

The drawings show a portion of the roof 12, a portion of one of the side walls 13, and a portion of the front end wall 14 of the vestibule of a motor truck body, the front wall 14 being provided in its upper portion with a suitable sight opening or openings, which may be protected by a glass windshield or otherwise. In the side wall 13 is a doorway 15, shown unobstructed by Figures 2 and 3, and closed by Figure 4. 16 represents the inner leaf, and 17 the outer leaf of a foldable door, adapted to close the doorway, each of said leaves extending from the top to the bottom of the doorway. The inner leaf is connected by hinges 18 with the forward upright edge of the doorway. The outer leaf is connected by hinges 19 with the swinging edge of the inner leaf, and is adapted to close against the rear upright edge of the doorway, as shown by Figure 4.

20 represents an upper link pivoted at 21 to the upper portion of the leaf 17, and at 22 to a fixed support in the upper portion of the vestibule, said support being preferably a bracket 23, attached to the side wall 13 above the doorway, and projecting inward in close proximity to the roof. 24 represents a lower link, pivoted at 25 to the outer leaf 17, and at 26 to a fixed support, which is preferably the floor of the vestibule, the lower link being below said floor and below the doorway. The pivotal connections between the links and the leaf 17 are in vertical alinement with each other, and the pivotal connections between the links and said fixed supports are also in vertical alinement with each other. The arrangement is such that when the door is fully opened, as shown by Figures 1, 2 and 3, the inner leaf 16 projects forward from the forward edge of the doorway, and the outer leaf 17 is confined by the links 20 and 24 at an angle to the inner leaf, and in position to deflect wind outwardly, as indicated by arrows in Figures 1 and 3, so that wind is prevented from forcibly entering the open doorway. The driver of a delivery truck may, therefore, allow the door to remain open while the truck is in use, and is protected against side drafts, by the open door.

I provide means as next described, for positively swinging the inner leaf 16 to its open and its closed positions. When the inner leaf is being swung to its closed position, the links 20 and 24 direct the outer leaf 17 into the rear portion of the doorway. I preferably embody the leaf-swinging means in an upright rock-shaft or rod 28, journaled in a fixed bearing 29, near the floor of the vestibule, and passing through said floor. To the lower end of the rock-shaft is fixed a crank-arm 30, having a slot 31, in its outer end, receiving a pin or stud 32 projecting downward from the lower end of the inner leaf 16. A loose connection is thus provided between the crank-arm and the inner leaf, the arrangement being such that when the crank-arm is in the position shown by Figure 3, the door is fully opened, and when said arm is in the position shown by Figure 4, the door is fully closed. To lock the door either open or closed, I provide a curved bar 33, which is fixed to the vestibule, and partly surrounds the rock-shaft 28, said bar having notches 34 and 35. To the rock-shaft I pivot at 36 a locking dog 37, which engages the notch 35 to lock the door open, and the notch 34 to lock the door closed. The dog 37 constitutes a handle by which the rock-shaft may be turned in either direction.

An important advantage of my invention is that, when the folding door is opened, its leaves are stored well out of the doorway, so that the latter is practically unobstructed when the door is open, and is folded, so that it is out of the way, and is not liable to strike objects external to the vehicle. The driver of a delivery truck may, therefore, leave the door open while making his rounds. This advantage is due to the fact that the inner leaf projects forward from the doorway, and substantially in line with the side of the vehicle, and the outer leaf is confined beside, and in fixed relation to the inner leaf, when the door is opened.

I claim:

1. In combination with a motor truck body, comprising a vestibule having a side doorway, a foldable door composed of an inner leaf hinged to the forward edge of the doorway, an outer leaf hinged to the swinging edge of the inner leaf and adapted to close against the rear edge of the doorway, each of said leaves extending from top to bottom of the doorway, upper and lower links pivoted to the upper and lower end portions of the outer leaf relatively near the outer edge thereof, and to fixed supports on the body, one of said supports being above and the other below the doorway, and manually operable means for swinging the inner leaf to its open and closed positions, said links being adapted to fold the door and confine the inner leaf projecting forward from the doorway, and the outer leaf beside and in fixed relation to the inner leaf when the latter is fully opened, and to direct the outer leaf into the rear portion of the doorway when the inner leaf is swung to its closed position.

2. In combination with a motor truck body, comprising a vestibule having a side doorway, a foldable door composed of an inner leaf hinged to the forward edge of the doorway, an outer leaf hinged to the swinging edge of the inner leaf, and adapted to close against the rear edge of the doorway, each of said leaves extending from top to bottom of the doorway, upper and lower links pivoted to the upper and lower end portions of the outer leaf relatively near the outer edge thereof, and to fixed supports on the body, one of said supports being above and the other below the doorway, and a vertical door-opening and closing rock-shaft journaled in the vestibule, projecting through the floor thereof, and provided below the floor with a crank-arm engaged at its outer end with the inner leaf, said rock-shaft and crank-arm being adapted to positively swing the inner leaf to an open position, projecting forward from the doorway, and to a closed position within the forward portion of the doorway, the said links being adapted to fold the door and confine the outer leaf beside and in fixed relation to the inner leaf, when the latter is fully opened, and to direct the outer leaf into the rear portion of the doorway, when the outer leaf is swung to its closed position, means being provided for locking the rock-shaft to lock the door fully opened and fully closed.

3. In combination with a motor truck body, comprising a vestibule having a side doorway, a foldable door composed of an inner leaf hinged to the forward edge of the doorway, an outer leaf hinged to the swinging edge of the inner leaf, and adapted to close against the rear edge of the doorway, links pivoted to the upper and lower end portions of the outer leaf, and to fixed supports on the body, a door-opening and closing rock-shaft journaled in the vestibule, projecting through the floor thereof, and provided below the floor with a crank-arm engaged at its outer end with the inner leaf, said rock-shaft and crank-arm being adapted to positively swing the inner leaf to an open position, projecting forward from the doorway, and to a closed position within the forward portion of the doorway, the said links being adapted to confine the outer leaf beside and in fixed relation to the inner leaf, when the latter is fully opened, and to direct the outer leaf into the rear portion of the doorway, when the outer leaf is swung to its closed position, and means for locking the rock-shaft and the door in either of two positions, said means being embodied in a fixed curved bar adjacent to the upper end of the rock-shaft, and provided with a plurality of notches, and a dog carried by the rock-shaft, and adapted to engage either of said notches, said dog constituting a handle whereby the rock-shaft may be turned.

4. A motor truck body embodying the combination specified by claim 1, the said links being arranged to rigidly brace the outer leaf and hold the latter at a wind-deflecting angle to the inner leaf when the door is in its folded open position, the arrangement being such that the opened door has a minimum lateral projection from the side of the vehicle.

In testimony whereof I have affixed my signature.

CHARLES L. JEANES.